J. F. LEWIS.
AUTOMATIC GREASE CUP.
APPLICATION FILED APR. 10, 1912. RENEWED MAR. 24, 1914.

1,094,730.

Patented Apr. 28, 1914.

Inventor
John F. Lewis
By H. W. Williamson
Attorney

Witnesses
M. P. Williamson
M. H. LoRee

UNITED STATES PATENT OFFICE.

JOHN F. LEWIS, OF PHILADELPHIA, PENNSYLVANIA, ASSIGNOR TO L. AND B. GREASE CUP COMPANY, OF PHILADELPHIA, PENNSYLVANIA, A CORPORATION OF DELAWARE.

AUTOMATIC GREASE-CUP.

1,094,730. Specification of Letters Patent. Patented Apr. 28, 1914.

Application filed April 10, 1912, Serial No. 689,893. Renewed March 24, 1914. Serial No. 827,001.

*To all whom it may concern:*

Be it known that I, JOHN F. LEWIS, a citizen of the United States, residing at Philadelphia, in the county of Philadelphia and State of Pennsylvania, have invented new and useful Improvements in Automatic Grease-Cups, of which the following is a specification.

My invention relates to new and useful improvements in automatic grease cups, and has for its object to provide such a cup in which the grease will be fed by means of compressed air contained in the upper portion thereof and to provide means in the form of a corrugated funnel for limiting the downward movement of the disk, said disk dividing the cup into a grease chamber and an air reservoir.

A further object of the invention is to construct the corrugated funnel in such form as to produce a positive stop, therefore causing the funnels mounted in the different cups to be held in the same relative position regardless of the dimensions of the cups which often vary in size at the outlet or spout.

A still further object of the invention is to form a corrugated funnel having a spout with a reduced end, said reduced end being used to secure the funnel in position and further to form the side walls of the funnel on suitable curvature lines whereby the funnel may be forced into the spout of the grease cup so that it will more readily fit said spout and remain in contact with the walls thereof at which time the body and spout of the funnel will be accentuated.

Another object of the invention is to construct the closed end of the top in such manner as to form means for centering and holding the upper end of the tube or guide, the lower end of which is held in place by a suitable flanged cap.

A still further object of the invention is to provide means for holding the flanged cap in place, said means also acting as a stop for the sliding disk.

With these ends in view, this invention consists in the details of construction and combination of elements, hereinafter set forth and then specifically designated by the claims.

In order that those skilled in the art to which this invention appertains, may understand how to make and use the same, I will describe its construction in detail, referring by numerals to the accompanying drawing forming a part of this specification, in which—

Figure 1:
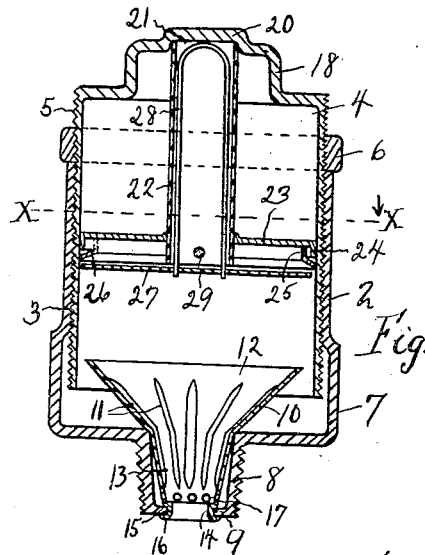
Figure 2:
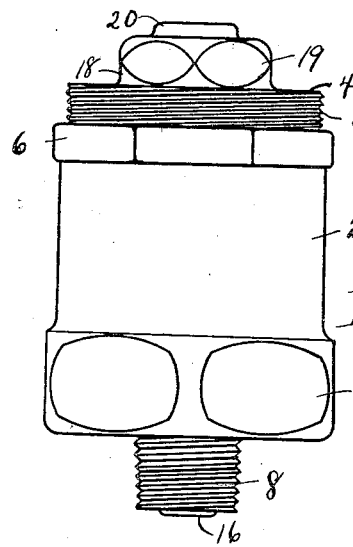
Figure 3:
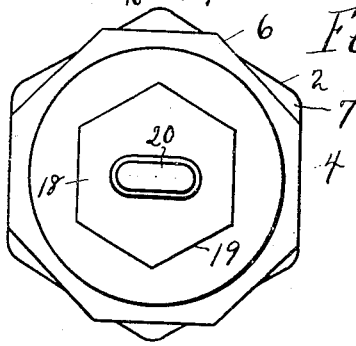
Figure 5:
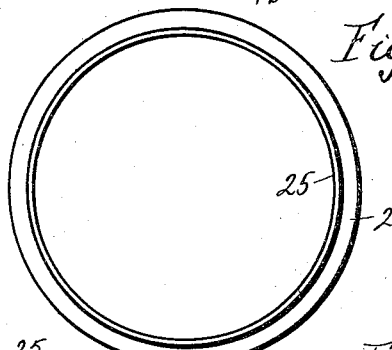
Figure 6:
Figure 4:
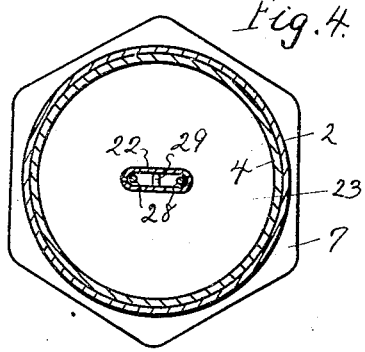
Figure 7:
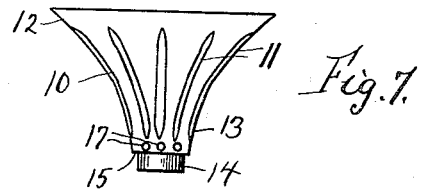

Figure 1, is a longitudinal sectional view of my improved automatic grease cup. Fig. 2, is a side elevation thereof. Fig. 3, is a plan view. Fig. 4, is a section at the line —*x x*— of Fig. 1, looking in the direction of the arrow. Fig. 5, is an enlarged edge view of the ring which holds the cap in place. Fig. 6, is a transverse sectional view thereof, and Fig. 7, is a side elevation of the corrugated funnel before being placed in the grease cup.

In carrying out my invention as here embodied, 2 represents the body provided with internal threads 3, and 4, the top having corresponding external threads 5 whereby said top may be threaded into the body as plainly shown in Fig. 1. A jam nut 6 is also threaded upon the top of the cup and is adapted to be forced into contact with the upper edge of the body 2 so as to hold the top in any adjustment as may be readily understood.

The lower portion of the body 2 is swelled or enlarged as at 7 to form a multiple sided wrench hold and also an enlarged chamber and as is usual, the body is provided with a threaded nipple or spout 8 having a reduced opening or outlet 9, said nipple being screwed into the hole through which the lubricant is conveyed to the bearing to be lubricated.

10 denotes the funnel, the sides of which are fluted or corrugated as at 11 which permits the funnel to be forced into the nipple of the grease cup and snugly fit the same as can be readily seen in Fig. 1, and when so fitted in place causes the body 12 and the spout 13 of the funnel to be accentuated.

The lower end of the funnel spout is reduced in size as indicated by 14 forming a shoulder 15 which rests against the lower end of the grease cup nipple when the reduced portion 14 has been passed through the opening 9 in the nipple. After the funnel has been placed in position, that portion of the reduced end which projects beyond the nipple is spun over as at 16 to hold the funnel against accidental displacement.

In the lower end of the funnel spout just above the shoulder 15 are formed the perforations 17 which permits the grease that has passed into the nipple of the grease cup, around the funnel spout, through the passage ways produced by the corrugations, to pass into the spout of the funnel and then to the bearing to be lubricated.

The closed or upper end of the body is swelled outward to produce the multiple sided projection 18, the inside and outside being similar in shape, the outside forming the multiple sided wrench hold 19 while the inside forms a multiple sided mandrel hold which permits the top to be placed on the mandrel of a threading machine and hold said top against rotation during the operation. The top face of the multiple sided projection 18 is swelled or pressed out as at 20 to produce the centering and holding socket 21 which is the same shape as the tube 22.

The tube 22 acts as a guide as will be hereinafter described and carries in proximity to its lower end a cap 23 provided with a flange 24, said cap snugly fits the interior of the top 4 but does not fit the same tight enough to hold it in place. It has been found in practice that when said cap is made of sufficient size to tightly fit in the top, it causes a swelling of the top preventing the same from being threaded into the body, it also causes the cap to become misshaped so that the working of the parts in conjunction therewith is not satisfactory. Because of the foregoing disadvantages, I have designed a suitable means for holding the cap in place which consists of a ring 25 having a flange 26, said flange being produced at a suitable angle to the ring as will be plainly seen in Fig. 6. After the cap 23 is placed in position, the holding ring 25 can be forced into the top until its edge contacts with the under face of the cap 23 and because of the angle of the flange 26 and the fact that there is no metal disposed across the opening of the ring, said ring will adapt itself to the size of the interior of the top without injuring the contour thereof and if an attempt is made to remove the ring, the angle of the flange will cause it to "bite" into the walls of the top.

27 is the sliding disk adapted to move rectilinearly in the top and to this disk is secured the staple wire 28, the latter adapted to slide in the tube or guide 22 and being prevented from accidental withdrawal therefrom by the pin 29 disposed across the lower end of the tube. The projection 18 has a further object than those hereinbefore described which is the lengthening of the movement of the disk 27 without changing the relative sizes of the body and top and with the further addition of the chamber 21, the stroke of the disk is further lengthened without any additional change in the dimensions of the body, or top. The additional length of the stroke permits the disk 27 to be removed from the top a sufficient distance to be readily cleaned and will also allow a greater amount of air to be compressed.

It has been found in practice that when no holding ring 25 was used, one edge of the disk 27, when its upward movement was complete, would contact with the flange 24 of the cap 23 while the opposite edge would slip inside of the flange throwing the disk at an undesirable angle but this difficulty is entirely overcome by the use of the holding ring 25 since said ring is of considerably smaller diameter than the disk.

The operation of the device is as follows: The body 2 is first filled with grease and the top portion 4 screwed therein, the disk 27 coming in contact with the grease will be forced upward in the top portion, compressing the air until said disk is stopped by the ring 25. The space above the cap 23 acting as a reservoir for the compressed air, said air reaching that portion which acts as a reservoir through the spaces between, and the cracks in, the parts, any further downward movement of the top 4 will force the grease through the funnel to the bearing with screw pressure, but when the top 4 is stopped at any position, the air compressed in the upper portion thereof will exert sufficient pressure upon the disk 27 and the grease to continue to feed the latter. When a sufficient amount of grease has been fed from the cup to bring the disk 27 into contact with the funnel 10, the air pressure will force the grease which is on the outside of the funnel, by way of the corrugations 11, through the holes 17 into the outlet of the funnel and to the bearing to be lubricated. By this arrangement an emergency supply of grease is provided which will not readily be fed to the bearings until after the disk has come in contact with the funnel, but which will flow down should the bearing become over-heated. By the relative arrangement of the disk 27 and the ring 25 which holds the cap 23 in place, the grease will not be forced above the cap, thus leaving sufficient space to act as an air reservoir. The construction of the funnel permits the same to be mounted in the nipple or spout 8 with the right amount projecting through the outlet 9 to be cupped up for securing the funnel in place since the thickness of the metal at the lower end of the spout does not vary, while the interior diameter of said spout where it joins the body of the cup and the distance between this point and the end of the spout often vary in size.

Of course I do not wish to be limited to the exact details of construction as here shown as these may be varied within the limits of the appended claims without departing from the spirit of my invention.

Having thus fully described my invention, what I claim as new and useful, is—

1. A grease cup consisting of a body and a top, the latter threaded into the former, a cap for dividing the cup into a grease receptacle and an air reservoir, and independent means for holding said cap stationary.

2. A grease cup consisting of a body and a top, the latter threaded into the former, a cap for dividing the cup into a grease receptacle and an air reservoir, and a ring co-acting with the cap and the walls of the top for holding said cap stationary.

3. A grease cup consisting of a body and a top, the latter threaded into the former, a cap for dividing the cup into a grease receptacle and an air reservoir, and a ring carrying a flange, the former co-acting with the cap and the latter with the walls of the top for holding the cap in its stationary position.

4. A grease cup consisting of a body and a top, the latter threaded into the former, a cap for dividing the cup into a grease receptacle and an air reservoir, a ring of smaller diameter than the cap, and a flange carried thereby projecting outwardly at a suitable angle, the edge of the ring coacting with the under face of the cap and the edge of the flange with the walls of the top for holding the cap in position.

5. A grease cup consisting of a body and a top, the latter threaded into the former, said top having a socket produced in its outer end, a guide tube, the outer end of which registers with said socket, a cap for dividing the cup into a grease receptacle and an air reservoir, said cap holding the lower end of the guide tube in position means for holding said cap in its stationary position and a disk slidably mounted in the cup.

6. A grease cup consisting of a body and a top, the latter threaded into the former, said top having a socket produced in its outer end, a guide tube, the outer end of which registers with said socket, a cap for dividing the cup into a grease receptacle and an air reservoir, said cap holding the lower end of the guide tube in position, means for holding said cap in its stationary position, a disk slidably mounted in the cup, means carried by the disk mounted in the guide tube, for guiding the disk, and means for preventing the accidental withdrawal of the last named means.

In testimony whereof, I have hereunto affixed my signature in the presence of two subscribing witnesses.

JOHN F. LEWIS.

Witnesses:
  M. H. Lo Ree,
  M. P. Williamson.